UNITED STATES PATENT OFFICE.

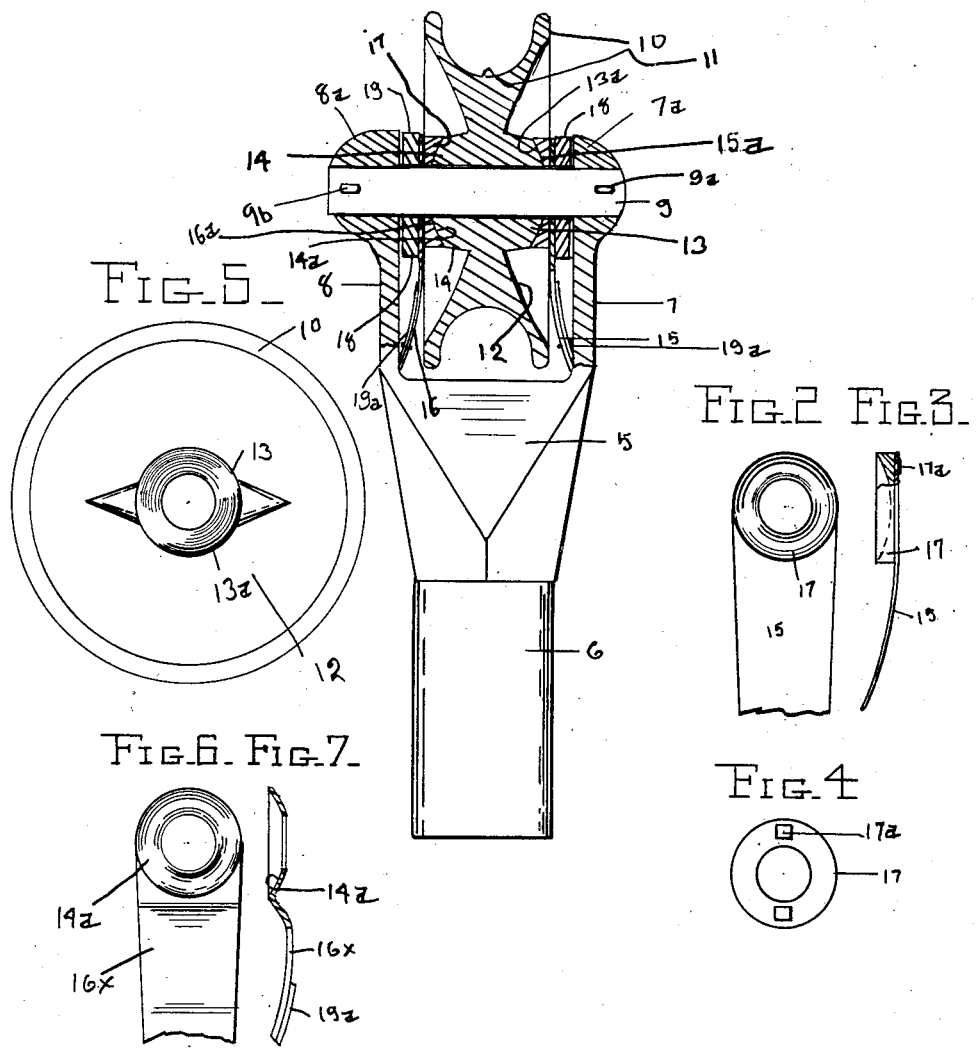

WILLIAM B. CULLEN, OF WESTFIELD, MASSACHUSETTS.

TROLLEY-WHEEL.

1,376,408.   Specification of Letters Patent.   Patented May 3, 1921.

Application filed July 21, 1919. Serial No. 312,367.

*To all whom it may concern:*

Be it known that I, WILLIAM B. CULLEN, a citizen of the United States of America, and resident of Westfield, in the county of Hampden and State of Massachusetts, have invented certain new and useful Improvements in Trolley-Wheels, of which the following is a full, clear, and exact description.

This invention relates to improvements in trolley wheels for use on electrically operated street and railroad cars and the leading object of the invention is to provide an improved bearing surface between the conductor spring or springs and the trolley wheel which will avoid arcing and evenly distribute the wear upon the contacting surfaces.

Trolley wheels as now generally used are mounted for rotation upon a harp mounted at the head of the trolley pole and contact is made between the trolley wheel and the electrical wiring of the car by means of the metallic springs which engage the end faces of the hubs of the wheel. During the rotation of the trolley wheel along the trolley wire the trolley wheel is shifted along the axle or shaft on which it is mounted and owing to the loose fit it has upon the shaft, the wheel has an irregular oscillating motion thereon which results in portions of the contacting springs being moved out of engagement with the hubs of the trolley wheel and the rim portion of the trolley wheel bearing against the shanks of the springs so as to cut deep grooves therein until the upper portions of the spring are completely sawed off and the spring fails to function in carrying the current from the wheel to the car wiring.

The result of the irregular movements and the shifting of the trolley wheel on its shaft so as to produce an irregular contacting action between the hubs of the trolley wheel and the contact springs is to cause excessive arcing and the over heating of the trolley wheel shaft with the result that it fails to rotate as it should and slides upon the trolley wire, thus forming deep cuts and impairing the efficiency of the wire.

My invention provides a means whereby a uniform contacting engagement will be maintained between the springs and the hub surfaces of the wheel at all times and the wheel will not move portions of the contact springs out of engagement therewith nor have an abrasive or saw cutting action on the springs.

With the above and other objects in view this invention relates to certain new and useful combinations, constructions, and arrangements of parts, clearly described in the following specification and fully illustrated in the accompanying drawings in which:

Figure 1 is a vertical sectional view taken through a trolley wheel and harp embodying my invention.

Fig. 2 is a detail side view of the upper end of the contact spring.

Fig. 3 is an edge view thereof, with a portion shown in section to show the manner of connecting the reinforcement to the body of the spring.

Fig. 4 is a side view of the reinforced end showing the connecting lugs thereof.

Fig. 5 is a side view of the trolley wheel showing the bearing surface on the end of the hub.

Fig. 6 is a side view of the upper end of a spring having a dished upper end formed by cupping the metal.

Fig. 7 is a vertical sectional view thereof.

Referring to the accompanying drawings 5 designates a harp of standard construction which is provided with the usual socket 6 to receive the trolley pole. The harp 5 is also provided with the usual upright arms 7 and 8 which provide bearings 7ª and 8ª for the shaft 9 which is extended through the bearings and held in place at one end by the flanged end portion 9ª and the cotter pin 9ᵇ at the other end.

On the shaft 9 the wheel 10 is mounted to rotate and this wheel is provided with the usual peripheral groove 11 to receive the trolley wire, as in the common fashion. The sides of the wheel 10 are hollowed at 12 to lighten the same and to provide the cylindrical hub portions 13 and 14 which extend in opposite directions on opposite sides of the wheel.

In my improved trolley wheel construction the end faces of the hub portions 13 and 14 are formed with spheroidal bearing surfaces 13ª and 14ª. Contact springs 15 and 16 are secured at their lower ends to the side of the harp as in the common practice, but the upper ends of these springs are provided with concave bearing surfaces 15ª and 16ª for engagement with the surfaces 13ª and 14ª. The surfaces 15ª and 16ª may be formed on a reinforcing element or disk 17 as shown in Figs. 1, 2 and 3 or formed directly on the upper ends of the springs 16ˣ as shown in Figs. 6 and 7. The reinforcing element 17 is connected in any suitable manner to the upper end of the spring, as by means of squared lugs 17ª extended through similar openings formed in the springs as indicated in Figs. 3 and 4, the lugs being riveted against the outer sides of the springs as will be readily understood.

The space between the outer faces of the upper ends of the springs and the inner faces of the bearings 7ª and 8ª is sufficiently great to permit the springs and the reinforcing elements thereon to swing outwardly to admit the trolley wheel therebetween. In assembling the device the springs are first secured in proper position and the trolley wheel is inserted between the springs. Washers 18 and 19 are then placed between the outer faces of the springs and the inner faces of the bearings 7ª and 8ª and the shaft extended through the bearings, washers, springs, and wheel, and locked in position on the harp.

The wear upon the springs is evenly distributed over the concave bearing surfaces thereof and no matter how the wheel oscillates or shifts on the shaft uniform contact is maintained between the contacting surfaces, which have a ball and socket action on each other. By the use of the reinforcing disk or annulus the life of the spring is greatly prolonged. In order to reinforce the shank of the spring I may employ steel spring reinforcing elements 19ª, connected to the shanks of the springs or arranged to bear against the outer sides thereof so as to increase the tension exerted by the springs upon the hub end faces.

My invention does not require any change in the present standardized practice and does not increase the service cost of the trolley wheel and in fact will materially reduce the service cost.

Various changes in the details of construction may be resorted to without departing from the spirit of the invention as defined in the annexed claims.

Having described my invention I claim and desire to secure by Letters Patent:

1. A trolley wheel construction including a harp providing opposing bearings, a wheel having a hub formed with convex end bearing surfaces, a pair of springs mounted on the harp and provided with concave bearing surfaces to engage the convex hub end bearing surfaces and a shaft extending through the springs and wheel hub and secured on the bearings.

2. A trolley wheel construction consisting of a harp providing opposing bearings, a wheel disposed between the bearings and provided with a hub having a contacting end surface, a spring secured at one end to the harp and having a contacting surface adapted to maintain constant contact with the hub contacting surface, one of said surfaces being concave and the other surface being convex and a shaft extending through the hub, spring and opposing bearings.

3. A trolley wheel spring having a shaft inclosing head and a reinforcing annulus secured thereto and provided with a concave wheel contacting surface.

4. A trolley wheel construction including a wheel having a hub provided on each of its ends with a convex contacting surface and a bore extending transversely therethrough, a harp having opposing sides, each provided with a bearing, a shaft secured in said harp bearings and extending through the bore, the wheel being free to turn on the shaft, a spring secured to each side of the harp and having a portion surrounding the shaft, an annular reinforcement secured to each spring head, each reinforcement having a concave bearing surface to receive the opposing convex and contacting surface of the hub, and a washer located between one of the springs and the opposing side of the harp to permit of the assembly of the parts.

Signed by me at Springfield, Mass.

WILLIAM B. CULLEN.